(12) United States Patent
Altieri et al.

(10) Patent No.: US 7,267,029 B2
(45) Date of Patent: Sep. 11, 2007

(54) BALANCING DEVICE FOR A ROTATING MEMBER AND ASSOCIATED METHODS

(75) Inventors: Russell E. Altieri, Cary, NC (US); Thomas E. Schulte, Manchester, MI (US); Jeffry Sharp, Brighton, MI (US); Brian K. Hackett, Saline, MI (US); William S. Jensen, Apex, NC (US)

(73) Assignee: Lord Corporation, Cary, NC (US)

( * ) Notice: Subject to any disclaimer, the term of this patent is extended or adjusted under 35 U.S.C. 154(b) by 0 days.

(21) Appl. No.: 10/292,977

(22) Filed: Nov. 13, 2002

(65) Prior Publication Data
US 2003/0089193 A1    May 15, 2003

Related U.S. Application Data

(60) Provisional application No. 60/332,755, filed on Nov. 14, 2001.

(51) Int. Cl.
*G01M 7/00* (2006.01)
*G06G 7/48* (2006.01)

(52) U.S. Cl. .................................... 74/574.1; 700/279

(58) Field of Classification Search .......... 74/572–574, 74/574.1, 574.2; 464/180; 700/279
See application file for complete search history.

(56) References Cited

U.S. PATENT DOCUMENTS

| | | |
|---|---|---|
| 3,149,502 A | 9/1964 | Caruso et al. |
| 3,968,769 A | 7/1976 | Gusarov et al. |
| 3,996,883 A | 12/1976 | Gusarov et al. |
| 4,096,988 A | 6/1978 | Scuricini |
| 4,292,769 A | 10/1981 | Maag et al. |
| 4,295,387 A | 10/1981 | Zhivotov et al. |
| 4,432,253 A | 2/1984 | Kerlin |
| 4,474,076 A | 10/1984 | Lehmann |
| 4,506,133 A | 3/1985 | Inoue |
| 4,644,123 A | 2/1987 | Kerlin |
| 4,688,355 A | 8/1987 | Menigat et al. |
| 4,711,610 A | 12/1987 | Riehl |
| 4,867,006 A | 9/1989 | Giberson et al. |
| 4,905,419 A | 3/1990 | Makarov et al. |
| 4,977,510 A | 12/1990 | Winzenz et al. |
| 5,092,195 A | 3/1992 | Parsons |
| 5,149,936 A | 9/1992 | Walton, II |
| 5,189,372 A | 2/1993 | Igarashi et al. |
| 5,231,265 A | 7/1993 | Hackett et al. |
| 5,240,358 A | 8/1993 | Hackett et al. |

(Continued)

FOREIGN PATENT DOCUMENTS

DE          131 297          6/1978

(Continued)

*Primary Examiner*—Chong H. Kim
(74) *Attorney, Agent, or Firm*—Edward F. Murphy, III

(57) ABSTRACT

A balancing device including a positionable member associated with a rotating member having an axis, wherein the positionable member has a substantially constant mass, and wherein the positionable member is disposed at a first position about the axis of the rotating member. The balancing device also including an actuation device disposed at a distance from the positionable member, wherein the actuation device is operable for selectively generating a force, and wherein the force is operable for moving the positionable member from the first position to a second position about the axis of the rotating member, thereby balancing the rotating member.

10 Claims, 7 Drawing Sheets

U.S. PATENT DOCUMENTS

| | | |
|---|---|---|
| 5,343,408 A | 8/1994 | Chen et al. |
| 5,431,049 A | 7/1995 | Kopp |
| 5,481,912 A | 1/1996 | Himmler |
| 5,540,615 A | 7/1996 | Murtuza |
| 5,549,019 A | 8/1996 | Cattani |
| 5,641,904 A | 6/1997 | Kopp et al. |
| 5,668,160 A | 9/1997 | Clough et al. |
| 5,676,025 A | 10/1997 | Lulay |
| 5,757,662 A * | 5/1998 | Dyer et al. ................ 700/279 |
| 5,760,302 A | 6/1998 | Moradi et al. |
| 5,767,403 A | 6/1998 | Kopp et al. |
| 5,769,545 A | 6/1998 | Bently et al. |
| 5,877,420 A | 3/1999 | Moradi et al. |
| 5,922,952 A | 7/1999 | Moradi et al. |
| 5,992,232 A | 11/1999 | Saitoh |
| 6,061,325 A | 5/2000 | Zaun |
| 6,131,454 A | 10/2000 | Kopp et al. |
| 6,210,099 B1 | 4/2001 | Hugbart et al. |
| 6,236,934 B1 | 5/2001 | Dyer et al. |
| 6,364,581 B2 | 4/2002 | Dyer et al. |
| 6,606,922 B2 * | 8/2003 | Case et al. ................ 74/573 R |

FOREIGN PATENT DOCUMENTS

| | | |
|---|---|---|
| DE | 270 136 A1 | 3/1988 |
| DE | 43 37 001 A1 | 5/1995 |
| DE | 101 16 869 A1 | 10/2001 |
| EP | 1 067 539 A1 | 10/2001 |
| WO | WO 93/23687 | 11/1993 |

* cited by examiner

BALANCING DEVICE FOR A ROTATING MEMBER AND ASSOCIATED METHODS

CROSS-REFERENCE TO RELATED APPLICATION(S)

This non-provisional patent application claims the benefit of U.S. Provisional Patent Application Ser. No. 60/332,755, filed on Nov. 14, 2001, entitled "Balancer for Movable Member," which is incorporated by reference in its entirety herein.

FIELD OF THE INVENTION

The present invention relates generally to the fields of vibration control and power generation/transmission. More specifically, the present invention relates to a balancing device operable for balancing a rotating member, such as a rotating shaft or the like, whereby the rotating member may be balanced without removing the rotating member from the operating environment or system in which it is disposed.

BACKGROUND OF THE INVENTION

In general, rotating members that rotate about an axis must be precisely balanced in order to perform properly. If such a rotating member is operated in an unbalanced state for any given period of time, as the rotating member rotates, it will produce out-of-balance forces that may negatively affect the operation of the rotating member itself and the operating environment or system in which it operates. Thus, before a rotating member is placed in an operating environment or system, it is preferably balanced. Typically, the rotating member is only rebalanced if its operating environment or system goes down and must be disassembled and subsequently reassembled. Rebalancing using conventional balancing devices is difficult and time consuming because, as described above, the rotating member to be rebalanced must be removed from the operating environment or system in which it is disposed, resulting in the temporary shut-down of the operating environment or system. The difficult and time-consuming nature of the rebalancing effort minimizes the number of rotating members that are regularly rebalanced after installation within an operating environment or system, decreasing the efficiency of these operating environments and systems.

The foregoing illustrates limitations known to exist in present balancing devices for rotating members and associated methods. Thus, it is apparent that it would be advantageous to provide an alternative directed to overcoming these limitations. Accordingly, a suitable alternative balancing device for a rotating member and associated methods are provided including the features and procedures more fully disclosed hereinafter. Advantageously, the balancing device for a rotating member of the present invention allows a rotating member to be balanced without removing it from the operating environment or system in which it is disposed. A portion of the balancing device for a rotating member of the present invention is also selectively removable from the operating environment or system.

BRIEF SUMMARY OF THE INVENTION

In various embodiments, the present invention provides a balancing device operable for balancing a rotating member, such as a rotating shaft or the like, whereby the rotating member may be balanced without removing the rotating member from the operating environment or system in which it is disposed.

In one embodiment of the present invention, a balancing device includes a positionable member associated with a rotating member having an axis, wherein the positionable member has a substantially constant mass, and wherein the positionable member is disposed at a first position about the axis of the rotating member. The balancing device also includes an actuation device disposed at a distance from the positionable member, wherein the actuation device is operable for selectively generating a force, and wherein the force is operable for moving the positionable member from the first position to a second position about the axis of the rotating member, thereby balancing the rotating member.

In another embodiment of the present invention, a balancing device includes a positionable member associated with a rotating member having an axis, wherein the positionable member has a substantially constant mass, and wherein the positionable member is disposed at a first position about the axis of the rotating member. The balancing device also includes an actuation device disposed at a distance from the positionable member, wherein the actuation device is operable for selectively generating a force, and wherein the force is operable for moving the positionable member from the first position to a second position about the axis of the rotating member, thereby balancing the rotating member. The actuation device is further operable for determining the position of the positionable member about the axis of the rotating member at any given time.

In a further embodiment of the present invention, a power generation/transmission system includes a rotating member having an axis. The power generation/transmission system also includes a positionable member associated with the rotating member, wherein the positionable member has a substantially constant mass, and wherein the positionable member is disposed at a first position about the axis of the rotating member. The power generation/transmission system further includes an actuation device disposed at a distance from the positionable member, wherein the actuation device is operable for selectively generating a force, and wherein the force is operable for moving the positionable member from the first position to a second position about the axis of the rotating member, thereby balancing the rotating member.

In a still further embodiment of the present invention, a method for balancing a rotating member having an axis includes disposing a positionable member at a first position about the axis of the rotating member, wherein the positionable member has a substantially constant mass. The method also includes disposing an actuation device at a distance from the positionable member, wherein the actuation device is operable for selectively generating a force, and wherein the force is operable for moving the positionable member from the first position to a second position about the axis of the rotating member. The method further includes selectively generating the force using the actuation device. The method still further includes moving the positionable member from the first position to the second position about the axis of the rotating member, thereby balancing the rotating member.

BRIEF DESCRIPTION OF THE DRAWINGS

The following drawings are used herein below to describe various aspects and embodiments of the balancing device for a rotating member of the present invention. Throughout the various views, where possible, like parts are referred to using like reference numbers.

DETAILED DESCRIPTION OF THE INVENTION

Figure 5:
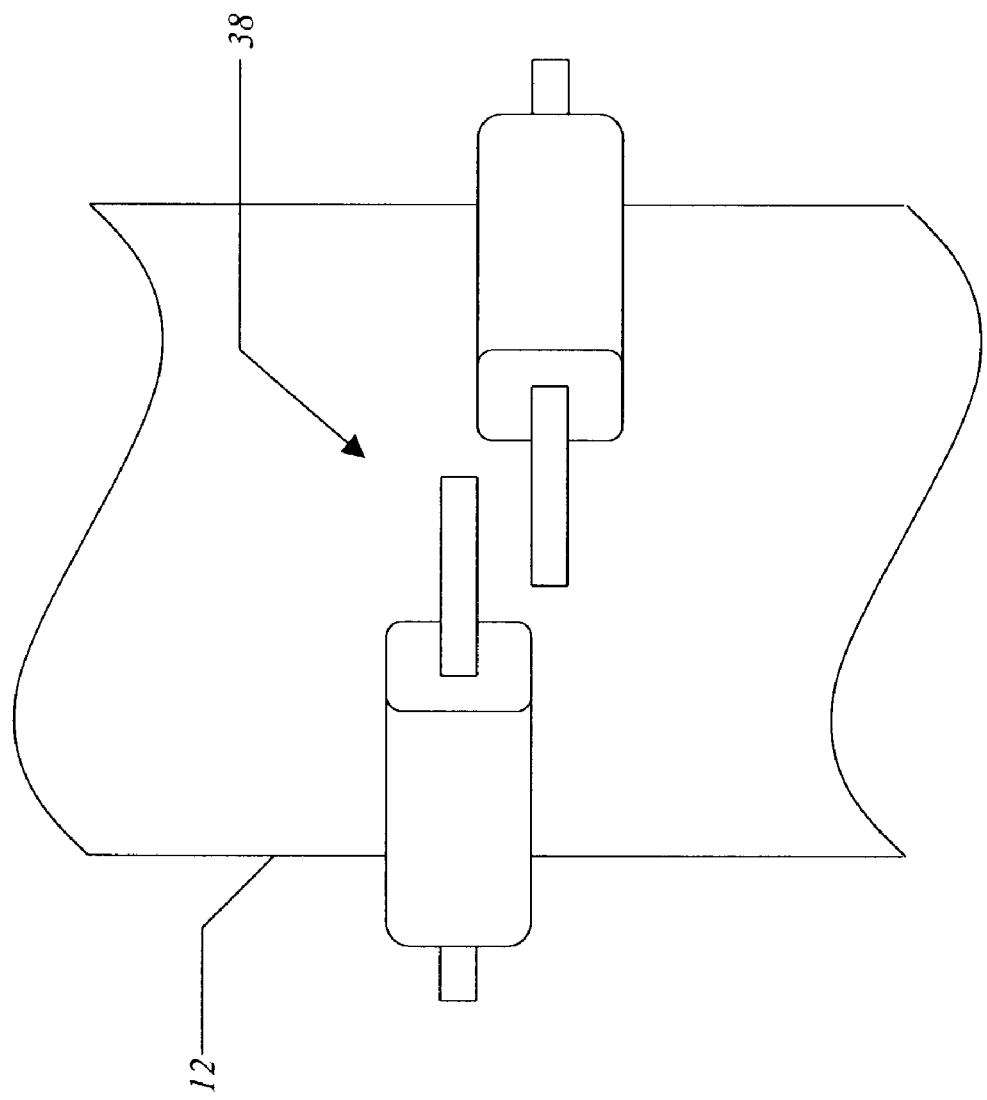
FIG. 5 is a schematic diagram illustrating one embodiment of the actuation device of the balancing device for a rotating member of the present invention.
Figure 6:
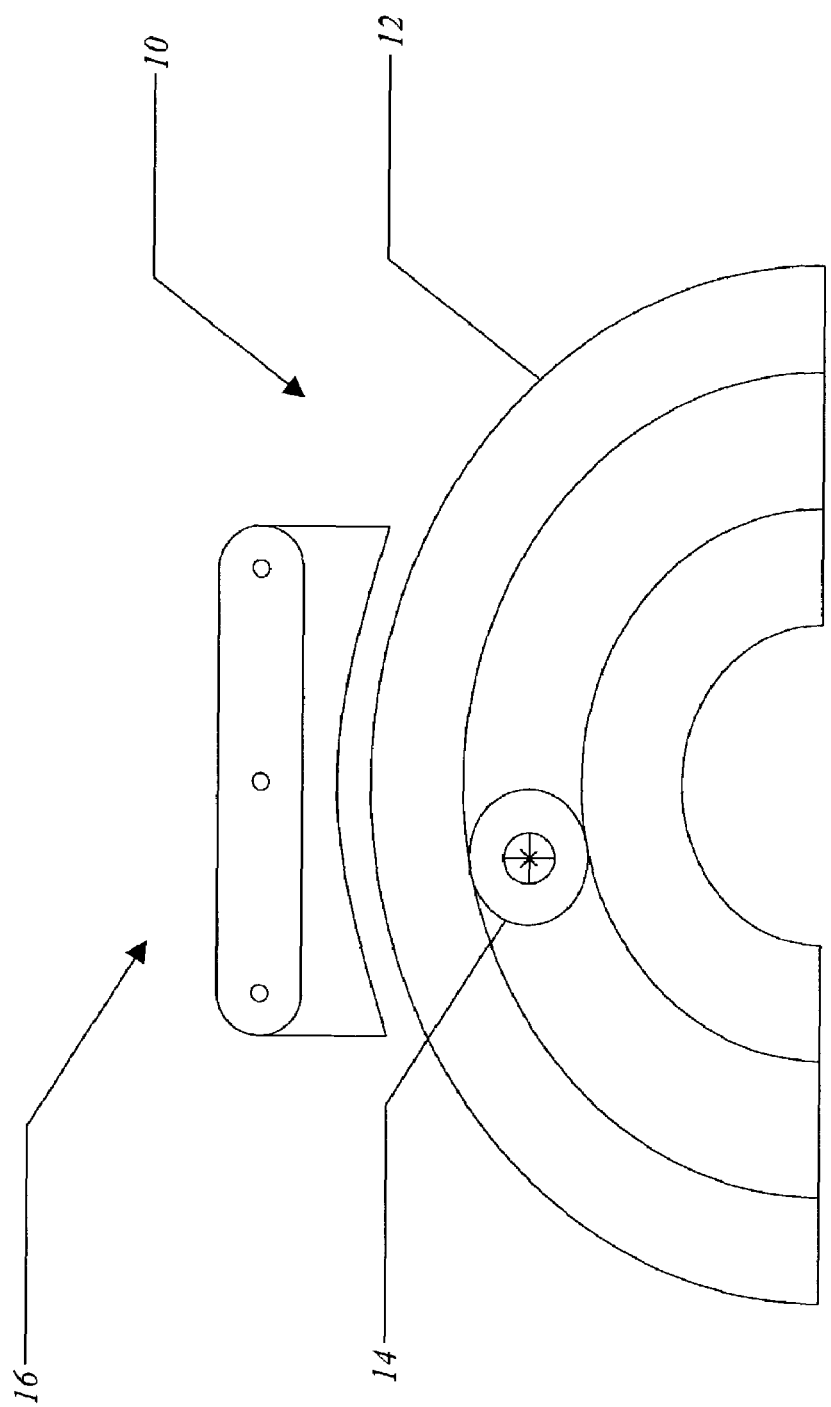
FIG. 6 is an end view of a further embodiment of the balancing device for a rotating member of the present invention, highlighting the rotating member, an alternative positionable member, and the actuation device.
Figure 7:
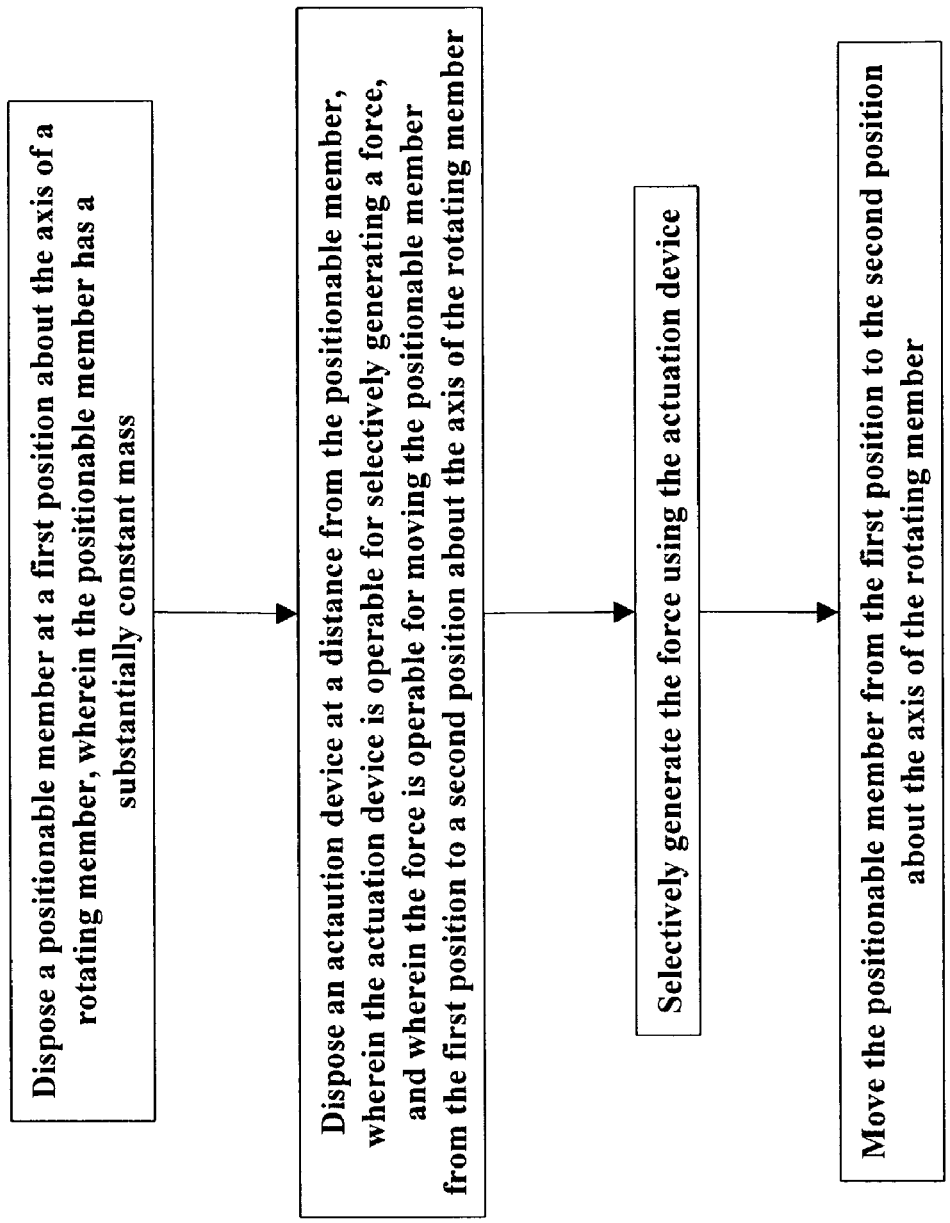
FIG. 7 is flow chart illustrating one embodiment of a method for balancing a rotating member having an axis of the present invention.

FIGS. 1-6 illustrate a balancing device that may be adapted to balance a rotating member before and/or after the rotating member has been installed in an operating environment or system. In other words, using the balancing device of the present invention, the rotating member does not need to be removed from the operating environment or system in which it is disposed in order to be effectively balanced. FIG. 7 illustrates an associated method for balancing a rotating member having an axis. For purposes of describing preferred embodiments of the present invention, the rotating member may comprise a rotating shaft or the like, such as a drive shaft, and the operating environment or system may comprise a vehicle, a power generation/transmission system, or the like.

Figure 1:
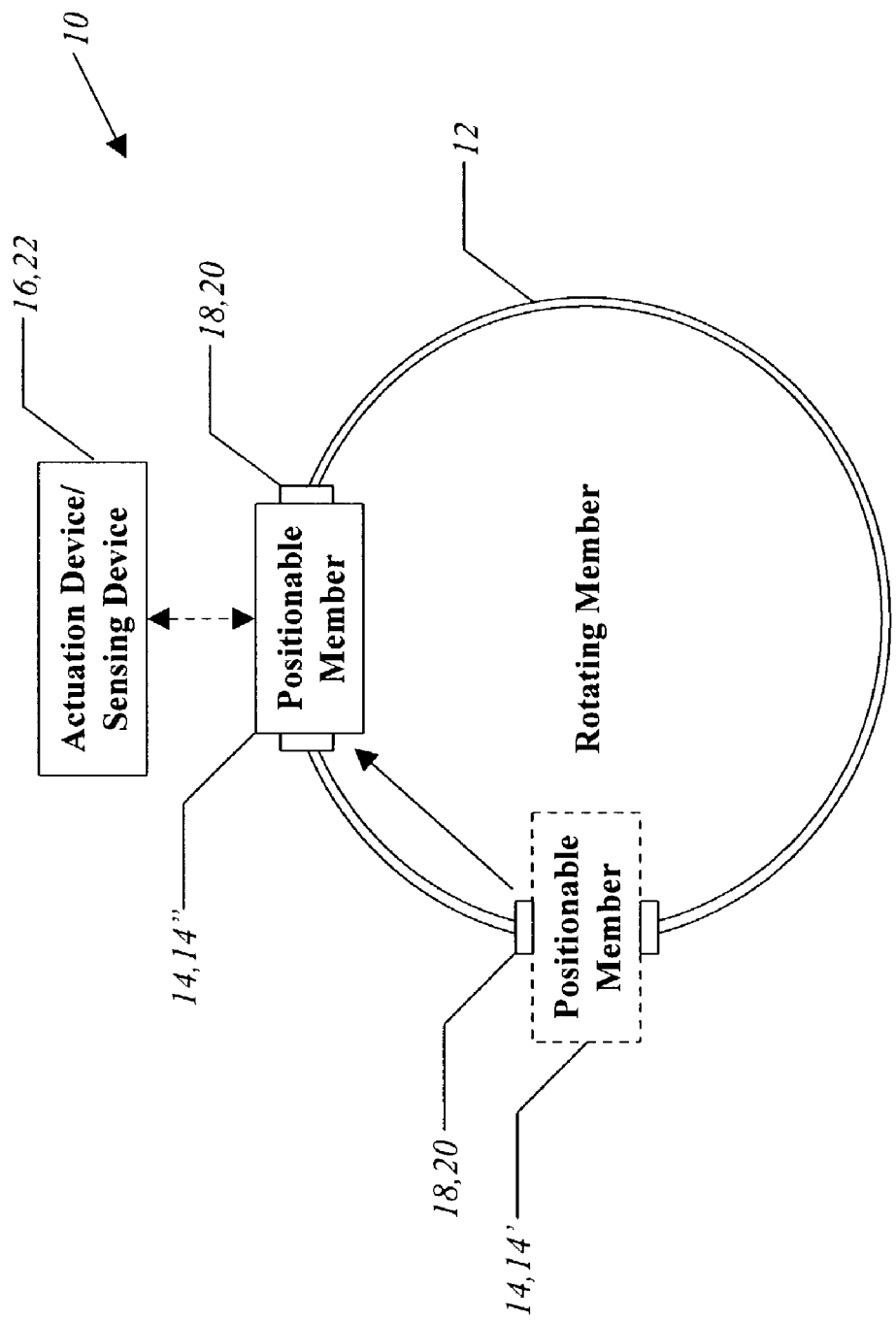
FIG. 1 is a schematic diagram illustrating the general configuration and operating principles of the balancing device for a rotating member of the present invention.

Referring to FIG. 1, in a general embodiment of the present invention illustrating the operating principles thereof, a balancing device 10 operable for balancing a rotating member 12 having an axis (not shown) includes a positionable member 14 associated with the rotating member 12. Preferably, the positionable member 14 has a substantially constant mass. Initially, the positionable member 14 is disposed at a first position 14' about the axis of the rotating member 12. An actuation device 16 is disposed at a distance from the positionable member 14. Preferably, the actuation device 16 is operable for selectively generating a force. This force is operable for moving the positionable member 14 from the first position 14' to a second position 14" about the axis of the rotating member 12 via attraction/repulsion. The positionable member 14 may be disposed within the interior of the rotating member 12 or, alternatively, outside of the rotating member 12.

It should be noted that the first position 14' of the positionable member 14 and the second position 14" of the positionable member 14 may be exaggerated in FIG. 1. Additionally, the first position 14' of the positionable member 14 and the second position 14" of the positionable member 14 about the axis are each expressed in a substantially fixed relation to a portion of the rotating member 12. Thus, the first position 14' of the positionable member 14 and the second position 14" of the positionable member 14 rotate about the axis in substantial coordination with the rotating member 12.

The positionable member 14 may comprise a magnetic material, a conductive material, or, alternatively, a combination of a magnetic material and a conductive material. In the case in which a magnetic material is used, the force generated by the actuation device 16 preferably comprises a magnetic force operable for moving the positionable member 14 from the first position 14' to the second position 14" about the axis of the rotating member 12. In the case in which a conductive material is used, the force generated by the actuation device 16 preferably comprises a force resulting from an eddy current operable for moving the positionable member 14 from the first position 14' to the second position 14" about the axis of the rotating member 12. Accordingly, the actuation device 16 may include a permanent magnet, an electromagnet, or the like.

Optionally, the balancing device 10 may also include one or more friction members 18 engaged with the positionable member 14. The friction members 18 are operable for resisting movement of the positionable member 14 from the first position 14' to the second position 14" about the axis of the rotating member 12. Alternatively, the balancing device 10 may include one or more magnetic detents 20 engaged with the positionable member 14, wherein the magnetic detents 20 are also operable for resisting movement of the positionable member 14 from the first position 14' to the second position 14" about the axis of the rotating member 12. It should be noted that, although FIG. 1 illustrates one (1) positionable member 14, a plurality of positionable members 14 and corresponding structures may be used, as illustrated in other embodiments described herein.

Optionally, the actuation device 16 is further operable for determining the position of the positionable member 14 about the axis of the rotating member 12 and acts as or includes a sensing device 22. Advantageously, the actuation device 16 is selectively removable from the balancing device 10.

Figure 2:
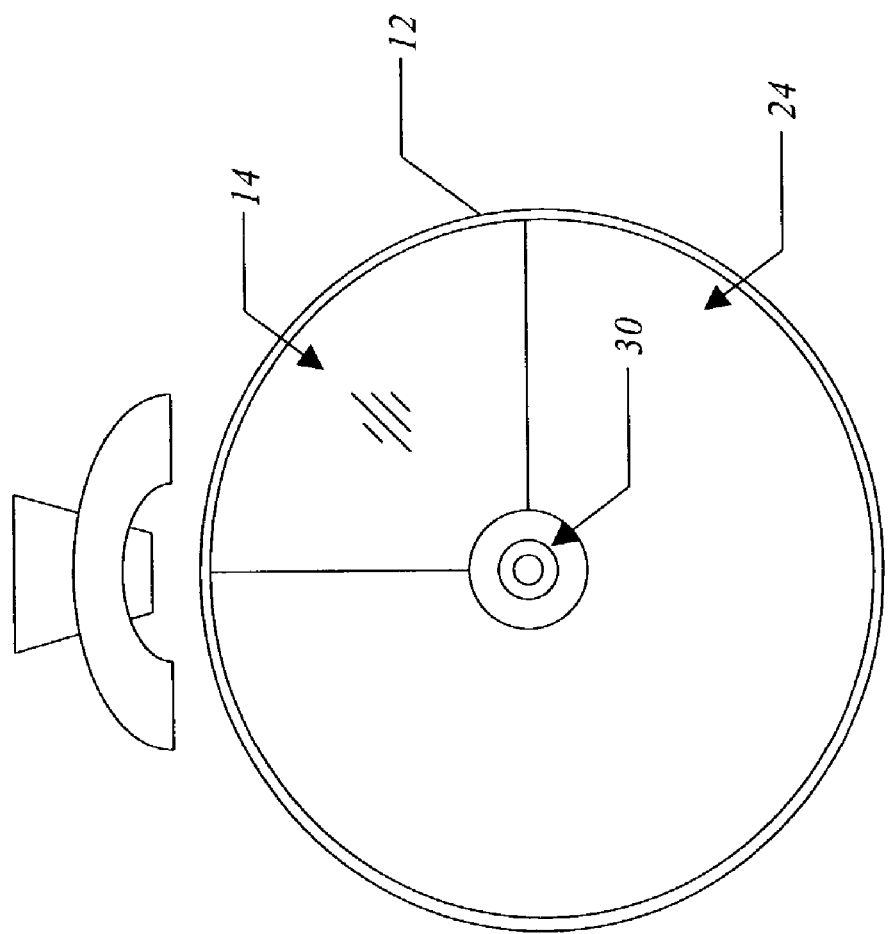
FIG. 2 is a cross-sectional end view of one embodiment of the balancing device for a rotating member of the present invention, highlighting the rotating member, a positionable member, and an actuation device.
Figure 4:
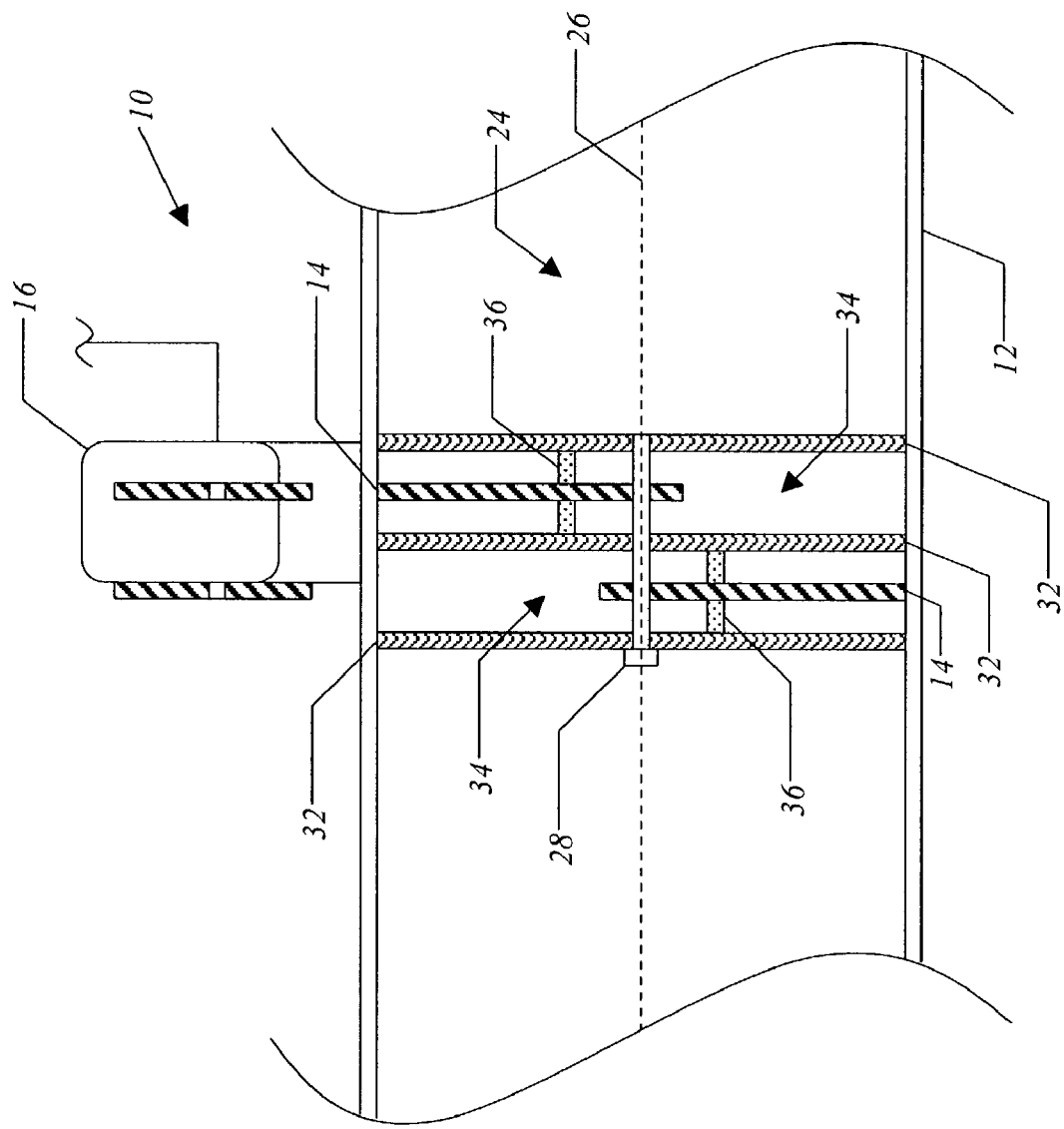
FIG. 4 is a cross-sectional side view of another embodiment of the balancing device for a rotating member of the present invention, highlighting the rotating member, a plurality of positionable members and an associated retention structure, and the actuation device.

Referring to FIG. 2, in one exemplary embodiment of the present invention, the rotating member 12 may comprise any suitable member made from a non-magnetic material, such as aluminum, a plastic, or the like. The rotating member 12 may be hollow along its complete length, or it may be substantially hollow with chambers or pockets provided in spaced-apart locations along the length of the rotating member 12. For purposes of describing this exemplary embodiment of the present invention, the rotating member 12 generally defines at least one chamber 24 adapted to receive one or more positionable members 14 (one positionable member 14 is illustrated in FIG. 2) that are repositionable within the chamber 24. Referring to FIG. 4, the balancing device 10 of the present invention includes two (2) positionable members 14 rotatable about an axis 26 of the rotating member 12. The axis 26 may be defined by and the positionable members 14 restrained by, for example, a bolt member 28 or the like. The positionable members 14, also variously referred to as "rotors," may be substantially wedge-shaped or fan-shaped. It should be understood, however, that any suitable number of positionable members 14 having any suitable substantially unbalanced shape may be provided in the chamber 24 and used to effectively balance the rotating member 12. For example, in an alternative embodiment of the present invention, the positionable members 14 may be substantially disc-shaped with a plurality of holes, dimples, or the like provided in an asymmetrical pattern in or on the surface of the positionable members 14. Referring to FIG. 6, in another alternative embodiment of the present invention, the positionable member(s) 14 may include one or more substantially puck-shaped structures disposed and moving within a channel located within or outside of the rotating member 12. The substantially puck-shaped structures may be provided with a resistive force via one or more friction members, magnetic detents, gears, or the like. The positionable members 14 may be made of any suitable magnetic or conductive material, such as steel or the like. The bolt member 28 may be supported by conventional bearing members 30 (FIG. 2) or the like supported by the positionable members 14. The bolt member 28 may be, for example, a shoulder bolt/lock nut combination or the like, well known to those of ordinary skill in the art. In exemplary embodiments of the present invention incorporating positionable member(s) 14 disposed outside of the rotating member 12, a split-ring configuration may be utilized.

Optionally, a plurality of partitions 32 comprising walls or spanning members disposed with or outside of the rotating member 12 separate the positionable members 14 and define sub-chambers 34 suitable for substantially containing the positionable members 14. The partitions 32 may be made of any suitable non-magnetic material, such as aluminum, a plastic, or the like. Optionally, a plurality of resilient members 36 may be disposed between the partitions 32 and the positionable members 14, serving to provide suitable resistive forces that prevent the undesired displacement of the positionable members 14 about the axis 26. Alternatively, one or more magnetic detents may accomplish the same purpose. In this manner, the positionable members 14 may only be repositioned when a field is supplied and a force is applied to the positionable members 14 by the actuation device 16.

Figure 3:
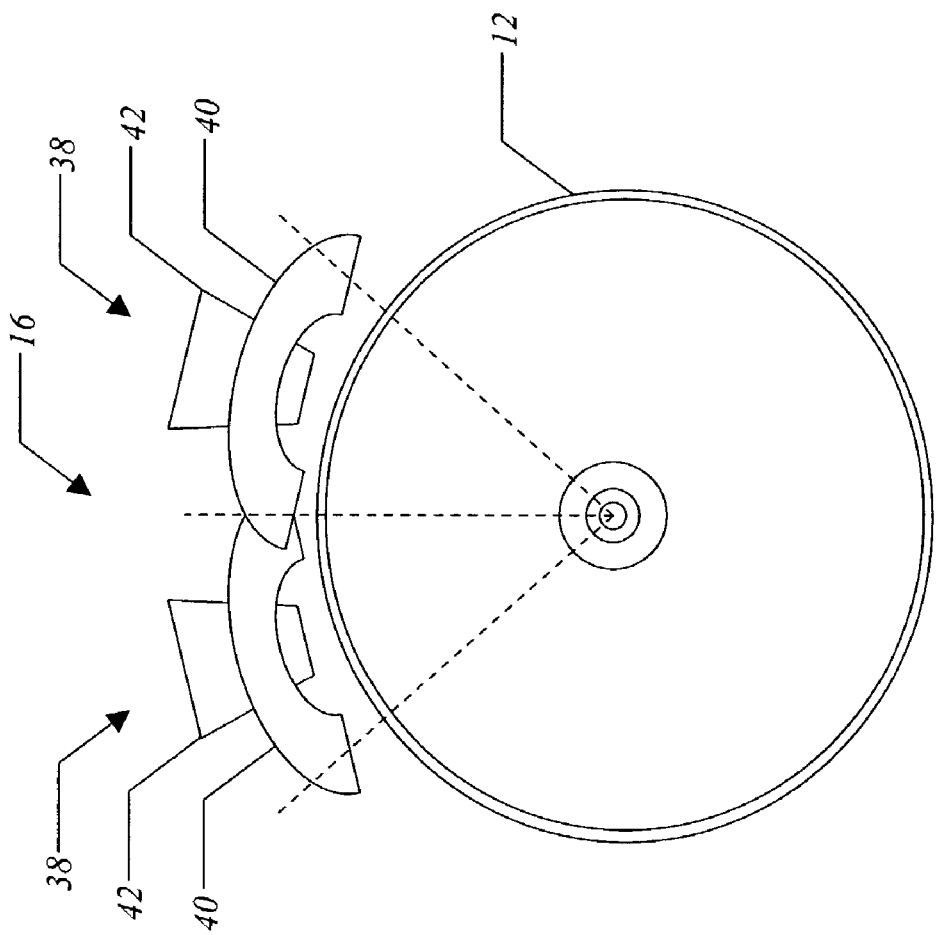
FIG. 3 is another end view of the balancing device for a rotating member of the present invention, highlighting the rotating member and the actuation device.

Referring to FIG. 3, in another exemplary embodiment of the present invention, the actuation device 16 may include a plurality of field generators 38 each comprising, for example, a substantially U-shaped magnetic core 40 nested within an outer coil 42 surrounding at least a portion of the core 40. The ends of each core 40 are preferably directed radially-inward toward the rotating member 12 and the positionable member(s) 14. As illustrated in FIGS. 4 and 5, the field generators 38 may be in an axially spaced-apart, parallel relationship. The field generators 38 may be separated by an angular distance of about 60 degrees or any other suitable angular distance. The cores 40 and the coils 42 may be supported by a conventional stand or fixture, or may be attached directly to a frame member within the operating environment or system. Neither the stand, fixture, nor frame are illustrated in the drawings as they do not form an integral part of the present invention.

In use, an electrical control signal intermittently energizes the coils 42 which may, optionally, be magnet wire coils. The cores 40, made from a magnetic material, direct magnetic flux towards the positionable member(s) 14 in order to attract the positionable member(s) 14 toward the actuation device 16 or, alternatively, to repel the positionable member(s) away from the actuation device 16. The electrical control signal is provided by a supply means (not shown) through a plurality of wires and/or connectors that are electrically connected to the coils 42.

The operation of the balancing device 10 for a rotating member of the present invention will now be described. In conjunction with correcting an imbalance of the rotating member 12, the distance separating the field generators 38 may be varied between about 0 degrees and about 180 degrees. The magnitude and phase of any imbalance may be adjusted by adjusting the phase of the positionable members relative to each other. It should be noted that the distance separating the field generators 38 does not necessarily determine the magnitude of the imbalance, but rather, it is used to separate the actuation devices 16 for individual positionable members 14. The imbalance of the rotating member 12 and/or the location(s) of the positionable member(s) 14 may be sensed by one or more conventional sensors, such as one or more displacement probes, velocity probes, vibration accelerometers, and/or hall effect sensors used to gain a timing signal, or, alternatively, by the actuation device 16 itself. Based upon the measured imbalance, an algorithm determines the angle of positionable member separation required to correct the sensed imbalance. The electrical control signal is transmitted to one or both of the coils 42 in a series of pulses, as required to separate the positionable members 14 by the required distance. Thus, the magnetic field may not be applied continuously. The applied magnetic field is of a magnitude sufficient to overcome the resistive forces produced by the one or more friction members 18 or magnetic detents 20. Once the positionable members 14 are relocated as required, the rotating member 12 is balanced. The balancing method of the present invention may be carried out before or after the rotating member 12 is installed in an operating environment or system. Alternatively, as described above, the attraction/repulsion of the positionable members 14 may be carried out by supplying eddy current induction to the positionable members 14. FIG. 7 summarizes the method for balancing a rotating member having an axis of the present invention.

It is apparent that there has been provided, in accordance with the devices and methods of the present invention, a balancing device for a rotating member. Although the devices and methods of the present invention have been described with reference to preferred embodiments and examples thereof, other embodiments and examples may perform similar functions and/or achieve similar results. All such equivalent embodiments and examples are within the spirit and scope of the present invention and are intended to be covered by the following claims.

What is claimed is:

1. A method for balancing a vehicle drive shaft rotating member having an axis, the method comprising:
disposing a vehicle drive shaft balancing mass positionable member at a first position about the axis of the vehicle drive shaft rotating member, wherein the vehicle drive shaft balancing mass positionable member has a substantially constant solid balancing mass;
disposing a selectively removable vehicle drive shaft balancing mass actuation device at a distance from the vehicle drive shaft balancing mass positionable member with said distance proximate said vehicle drive shaft rotating member, wherein the actuation device is operable for selectively generating a vehicle drive shaft balancing mass force, and wherein the vehicle drive shaft balancing mass force is operable for moving the vehicle drive shaft balancing mass positionable member substantially constant solid balancing mass from the first position to a second balancing position about the axis of the vehicle drive shaft rotating member;
selectively generating the vehicle drive shaft balancing mass force using the selectively removable vehicle drive shaft balancing mass actuation device; and
moving the vehicle drive shaft balancing mass positionable member substantially constant solid balancing mass from the first position to the second balancing position about the axis of the vehicle drive shaft rotating member, and removing said selectively removable vehicle drive shaft balancing mass actuation device from said vehicle drive shaft rotating member and said vehicle drive shaft balancing mass positionable member substantially constant solid balancing mass moved to said second balancing position.

2. The method of claim 1, wherein the positionable member substantially constant solid balancing mass comprises a magnetic material.

3. The method of claim 2, wherein selectively generating the vehicle drive shaft balancing mass force with the selectively removable vehicle drive shaft balancing mass actuation device includes generating an electromagnetic attraction force for electromagnetically attracting the positionable member substantially constant solid balancing mass magnetic material from the first position to the second position about the axis of the rotating member.

4. The method of claim 1, wherein the positionable member substantially constant solid balancing mass comprises a conductive material.

5. The method of claim 4, wherein selectively generating the vehicle drive shaft balancing mass force with the selectively removable vehicle drive shaft balancing mass actuation device includes generating an eddy current braking force which slows the rotation of said conductive material about the axis to move the positionable member substantially constant solid balancing mass conductive material from the first position to the second position about the axis of the rotating member.

6. The method of claim 1, wherein the actuation device comprises a permanent magnet.

7. The method of claim 1, wherein the actuation device comprises an electromagnet.

8. The method of claim 1, further comprising providing a friction member engaged with the positionable member, wherein the friction member is operable for resisting movement of the positionable member from the first position to the second position about the axis of the rotating member.

9. The method of claim 1, further comprising engaging said positionable member with a resilient member to prevent an undesired displacement of said substantially constant solid balancing mass about said axis.

10. The method of claim 1, further comprising determining the position of the positionable member about the axis of the rotating member.

* * * * *